United States Patent
Madhukar et al.

(10) Patent No.: US 9,736,182 B1
(45) Date of Patent: Aug. 15, 2017

(54) CONTEXT-AWARE COMPROMISE ASSESSMENT

(71) Applicant: EMC IP Holding Company LLC, Hopkinton, MA (US)

(72) Inventors: Anadi Madhukar, Bangalore (IN); Vishnu Chaitanya Pedasingu, Bangalore (IN); Renjith Damodara Pisharady, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 14/282,098

(22) Filed: May 20, 2014

(51) Int. Cl.
   *H04L 29/06* (2006.01)
(52) U.S. Cl.
   CPC .................... *H04L 63/20* (2013.01)
(58) Field of Classification Search
   CPC .................... H04L 63/00; G06F 21/10
   See application file for complete search history.

(56) References Cited

U.S. PATENT DOCUMENTS

| 8,955,038 B2* | 2/2015 | Nicodemus | G06F 21/55 |
| | | | 717/172 |
| 2008/0052514 A1* | 2/2008 | Nakae | G06F 21/6218 |
| | | | 713/168 |

* cited by examiner

Primary Examiner — Edward Zee
Assistant Examiner — Leynna Truvan
(74) Attorney, Agent, or Firm — Ryan, Mason & Lewis, LLP

(57) ABSTRACT

Assessing compromises of data security is achieved by establishing access control policies for data files in storage devices across an enterprise. A list is compiled of the data files that were accessed by processes executing on processors of the enterprise. A suspicion score is assigned to each of the processes based on deviations of in-memory behaviors of the processes from established criteria. In response to the suspicion score meeting a suspicious process criterion, the file system operations performed by the suspicious process are analyzed against the access control policies and the suspicion score is modified based on a degree to which the file system operations performed by the suspicious process violate the access control policies.

20 Claims, 3 Drawing Sheets

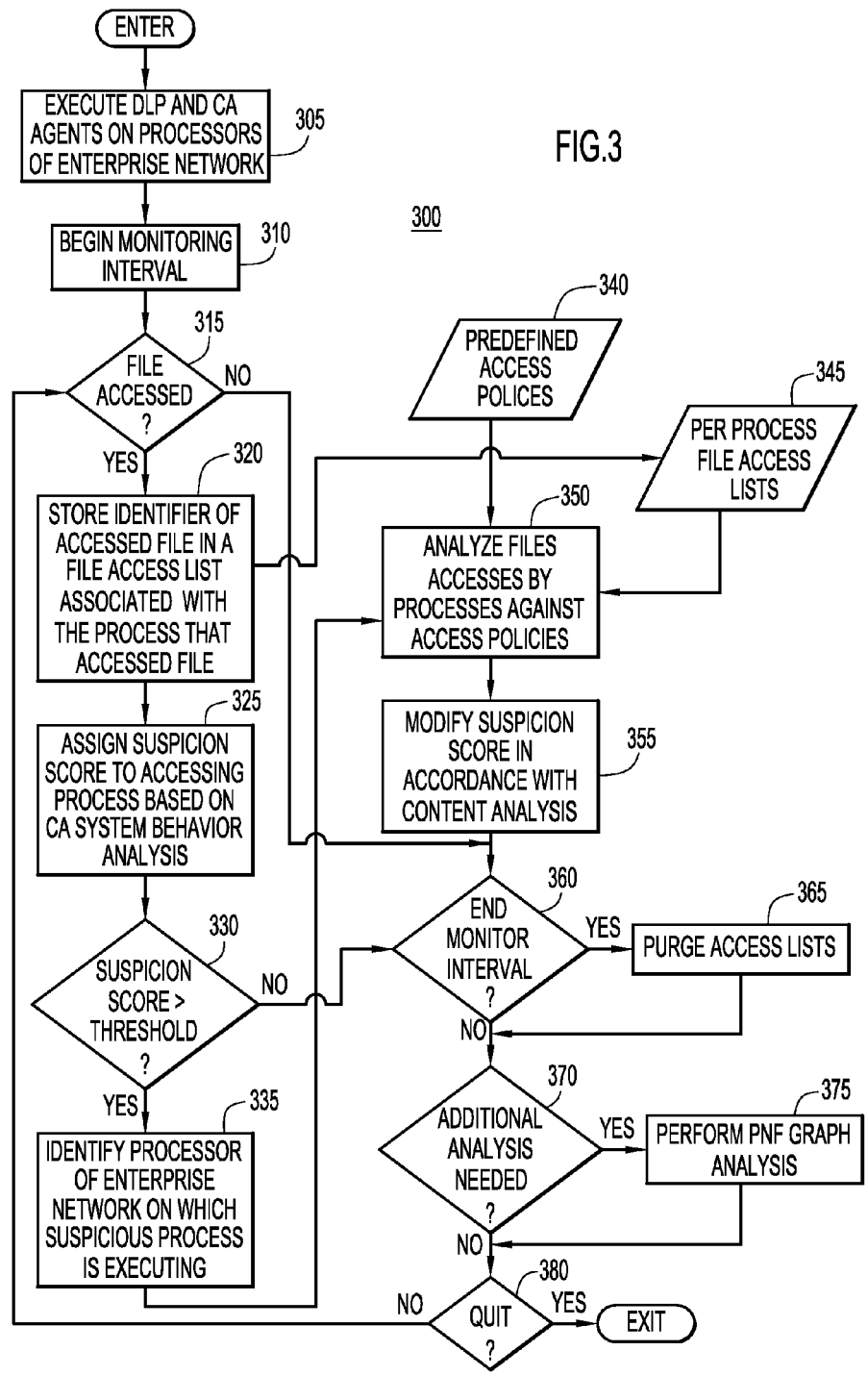

CONTEXT-AWARE COMPROMISE ASSESSMENT

TECHNICAL FIELD

The present disclosure relates to assessment of data security breaches in which exfiltration of data assets might be involved.

BACKGROUND

Advanced persistent threats (APTs) typically infect a system with intent of data exfiltration. These threats reside on a system as processes and can either be hidden or appear to the user as legitimate processes. Some malware reside in a system as modules loaded into genuine operating system processes. Though organizations can identify data exfiltration using traditional network monitoring and analysis tools, they may not be able to identify exactly what data was taken and, accordingly, what business value the leaked data might have. This is because most APTs transport stolen data in an encrypted format to command and control servers operated by the attackers, which typically cannot be analyzed by conventional network monitoring tools.

The assessment of stolen data is normally an estimate based on criticality of the attacked or of an infected asset. "What a machine contains," usually drives the investigation of what data can potentially be leaked by a malware attack. If, for example, a host containing source code is compromised, it is assumed that entire source code can be stolen. This makes it difficult to accurately assess the true loss of business value resulting from the breach. As a result, forensics experts investigating a breach do not have a complete picture of what data might be stolen from an attacked host. Thus, the need is apparent for techniques by which risk is determined from what a suspect process or module read and the true business value of potentially leaked data.

SUMMARY

Assessing compromises of data security is achieved by establishing access control policies for data files in storage devices across an enterprise. A list is compiled, such as over a moving window of time, of the data files that were accessed by processes executing on processors of the enterprise. A suspicion score is assigned to each of the processes based on deviations of in-memory behaviors of the processes from established criteria. In response to the suspicion score meeting a suspicious process criterion, the file system operations performed by the suspicious process are analyzed against the access control policies and the suspicion score is modified based on a degree to which the file system operations performed by the suspicious process violate the access control policies.

BRIEF DESCRIPTION OF THE DRAWINGS

FIG. 3 is a flow diagram of a content-aware compromise assessment process by which the present general inventive concept can be embodied.

DESCRIPTION OF EXAMPLE EMBODIMENTS

Figure 1:
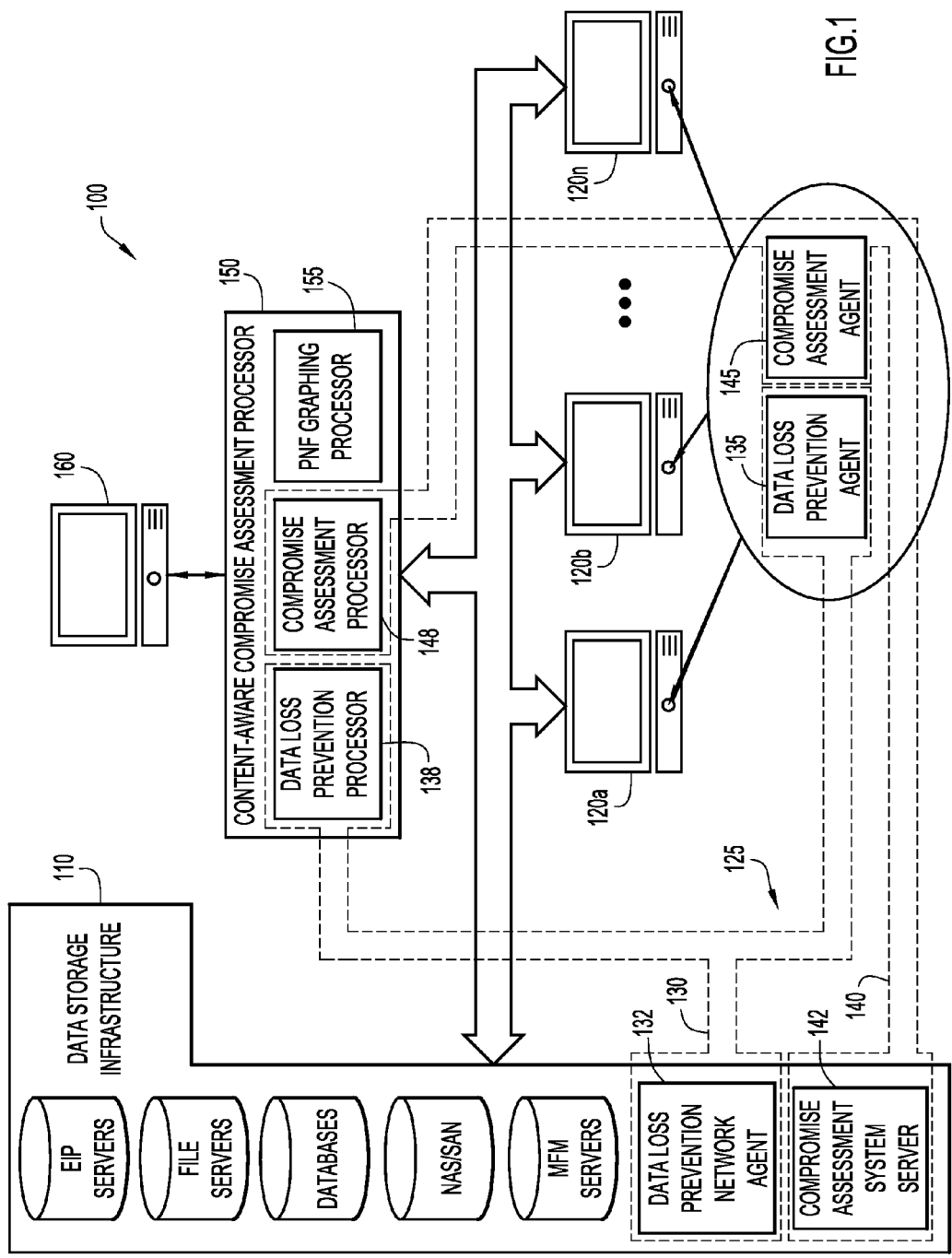
FIG. 1 is a schematic block diagram of an enterprise communication network in which the present general inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments The techniques described herein are directed to accurately assessing the damage done by a data security breach by identifying what data was leaked out as well as the business value of that data based on its content. The present invention integrates a compromise assessment (CA) system (CAS) that identifies suspicious processes executing on an enterprise network with a data leakage prevention (DLP) system (DLPS) that identifies data that are accessed by all processes executing on the enterprise network. File system operations and network operations can be filtered and correlated with the various processes that performed those operations. The correlations can be used to build contextual information in the form of a process-network-files (PNF) graph with which a security analyst can perform forensic analysis to identify suspicious activities that occurred on the machine and what data assets might have been lost.

FIG. 1 is a schematic block diagram of an enterprise communication network 100 in which data of one or more business units of the enterprise are stored on data storage infrastructure 110. As illustrated in FIG. 1, data storage infrastructure 110 includes enterprise information portal (EIP) servers, such as those implementing SHAREPOINT, a product of Microsoft Corporation, file servers, databases, network attached storage and storage area network storage (NAS/SAN), mobile file management (MFM) servers and other data repositories including cloud-based repositories (not illustrated). Data contained in data storage infrastructure 110 are accessed through endpoint terminals 120a-120n, representatively referred to herein as endpoint terminal(s) 120, which include desktop computers, laptop computers and other fixed workstation and mobile computing devices. One or more of endpoint terminals 120 can operate on enterprise data while being disconnected from enterprise network 100, such as through a laptop at a user's home or at a Wi-Fi accessible location. Accordingly, data storage infrastructure 110, as used herein, includes the volatile and persistent storage devices on endpoint terminals 120, even when such endpoint terminals 120 are disconnected from the enterprise network 100.

As illustrated in FIG. 1, exemplary enterprise network 100 includes a data security system 125 comprising a DLPS 130 and a CAS 140. DLPS 130 employs techniques that prevent information from being lost, stolen or misused and may comprise a DLP network agent 132, DLP endpoint agents 135 executing on endpoint terminals 120 and on processors of data storage infrastructure 110, and a DLP processor 138 through which activities of DLPS 130 are coordinated or otherwise controlled. DLP processor 138 also provides a central collection point for analysis data collected by all DLP agents 132 and 135. DLP processor 138 may provide analysis results and analysis tools to a security analyst through security console 160.

DLP network agent 132 is constructed or otherwise configured to identify and enforce policies for accessing sensitive data residing in data storage infrastructure 110, and to monitor and enforce policies for sensitive data sent through corporate email, webmail, instant messaging, file transfer protocol (FTP) transfers, social media, blogs, and other web traffic. DLP endpoint agents 135 identify and enforce policies for sensitive data stored on or in use on endpoint terminals 120 including laptops, desktops, virtual applications and virtual desktops. Compliance is enforced by DLP agents 132 and 135 through incident tracking and by audit trails of incidents.

In that each business unit within an enterprise has different security needs, DLPS 130 affords each unit to define role-based access through granular policy customization. DLPS 130 can customize policy responses by internal functional groups and can thus distribute remediation tasks to business managers. DLPS 130 may identify transgressions of policies or procedures that are often at the root of most data breaches. For example, a human resources representative might be sending out sensitive employee information to an external benefits vendor, unaware that this activity is in violation of a regulation or corporate policy. Employees can be notified of policy violations at the network level, such as by DLP network agent 132 or at the endpoint level, such as by DLP agent 135, and be given the option to continue the action or to cancel it. DLPS 130 analyzes all outbound content in a port-agnostic way so that no confidential or business-sensitive data can traverse the enterprise's containment boundaries.

CAS 140 employs live memory analyses in which CA agent 145 performs the analysis of a computer's memory to find traces of compromise and malware behavior. CA processor 148 may expose the memory resident processes to a security analyst, such as on security console 160. The memories throughout enterprise network 100 are scanned for operating processes in memory and all network connections are monitored as well. Such monitoring occurs while the computer is coupled to enterprise network 100 as well as when the computer is offline with respect to enterprise network 100, such as when a corporate computer is used at home or at Wi-Fi hotspots. CA agents 145 can determine risk from many behaviors, such as file hiding, key logging or code injection. CAS 140 can determine whether a suspect file is indeed malware or is a trusted file exhibiting extraordinary behavior for a legitimate purpose. For example, security or digital rights management software can use techniques similar to those used by malware. To make a clear decision, CA processor 148 collects intelligence data about suspicious modules through processes performed by CA endpoint agents 145 executing on each endpoint terminal 120 as well as on processors of data storage infrastructure 110 and CAS server 142 executing on data storage infrastructure 110. For example, CA agents 145 may employ low-level access parsers for disk, memory access and registry access; perform code integrity checks to locate malware hiding in trusted applications, such as a web browser, validate internal structures and code, such as system service dispatch tables, import and export address tables, interrupt descriptor tables, inline hooks, etc., perform memory dumps for memory forensics, perform abnormal communication pattern recognition, perform active tracing of network connections, module loading, file access and registry access; and locate and remotely download hacked and deleted files in a forensically sound manner.

CAS server 142 may integrate with multiple antivirus engines; perform external code signing verification at the server level to avoid being fooled at the workstation level; perform enterprise environment correlation to find all instances of malware among thousands of machines; implement a file and memory whitelist system; and serve as an integration point with National Institute of Standards and Technology (NIST), National Software Resource Library (NSRL) and BIT9 Global Software Registry whitelists.

Once a file has been deemed good or bad by CAS 140, it is flagged as such and, in the case of good files, such as those identified through whitelists, filtered from the alerting system. Performing an analysis of the data from the endpoint terminal 120 gives a grade of the level of suspicion or compromise of the machine. CAS 140 can flag the files that are the most suspect by attributing a "suspicion score," i.e., a numeric indicator used to triage the potentially infected systems and prioritize the analysis process.

Endpoint terminals 120 may be granted access to data residing on data storage infrastructure 110 in accordance with access policies of DLPS 130. Such access policies may include regular expressions used to identify certain categories of data or terms that might signal disclosure of sensitive data. Access policies may include identities of designated portions of a file hierarchy used in the enterprise, user permissions, descriptive data of what is considered business sensitive, and so on. DLPS 130 may use access policies to identify content within a wide variety of files based on definitions of business sensitive information. Those having skill in the data protection arts will recognize numerous access policy mechanisms that can be used in conjunction with the present invention without departing from the spirit and intended scope thereof.

DLP agents 135 may continuously monitor and maintain a list of files accessed by each operating system process. Any file that is leaked out of an enterprise by malware has to be read by the malware process or module from the file system of the infected endpoint terminal 120. DLP agents 135, installed on endpoint terminals 120 as a prerequisite, may intercept operating system calls made by any and all processes executing on that particular machine through which files present in the machine's file system are read. Using such information from the intercepted system calls, a list of operating system paths of the files that were read per process or per module are maintained by DLPS 130, either within the endpoint terminal 120 itself or in a centralized database. Such list is referred to herein as an "access list" and is generated by the DLP agent 135. For example, if files located at c:\temp\a.txt and c:\test\b.txt were read by module TestMod.dll, then the paths "c:\temp\a.txt" and "c:\test\b.txt" would be entered into the access list specific to TestMod.dll. A configurable window of time can be specified in terms of age of the access list. For example, a list of files read by each process can be maintained for the last 24 hours in a moving window, where all past entries outside the window are purged from the respective access lists. Alternatively, if periodic scans are done on each host to detect suspicious activity, the age of access list can be same as the interval between two scans.

Once the files that were accessed are compiled in the access lists, host-based forensics can be performed via CAS 140 so as to identify suspected operating system processes or modules involved in possible data exfiltration. CA agent 145 executing on the infected host gathers information about the attack and provides, for example, a list of processes and modules involved in suspicious activity. CA processor 148 may use various techniques, such as those indicated above, to identify whether a process or module is involved in suspicious activity and may assign a suspicion score to the process or module based on the in-memory behavior of the process. A module or process with a high suspicion score is to be considered a likely candidate for the process responsible for either deploying malware on the endpoint or responsible for leaking data outside of the enterprise. As an example, it is to be assumed that a process malwareOne.exe has been identified to be of high suspicion score, for example, a score of 46, by CAS 140, which is subject to change by further analysis in accordance with embodiments of the present invention.

The access lists for processes or modules showing suspicious activity and containing the paths of recently read files by each such process or module are retrieved, either from the endpoint terminal 120 on which the process was executing or from a centralized database, as the case may be. In the current example, it is to be assumed that the access list of malwareOne.exe mentioned above is retrieved and contains the identities of 12 files.

The files in the access list of a suspect process, such as malwareOne.exe, may be classified against access policies of DLPS 130 to determine whether sensitive content is contained in any of the files. Content analysis may be carried out by DLPS 130 either at a centralized server after copying the files listed in the access list from their respective paths to the centralized server. Content analysis can also be carried out locally on an infected endpoint terminal 120 if content analysis components are locally available on that machine. Content analysis processes of DLPS 130 can extract text out of files and can run regular expression matches pertaining to access policies against them. This way DLPS 130 can identify whether a file contains sensitive information. It can also identify the amount of sensitive information present in the file as well as degrees to which the data in the file is sensitive to a particular business unit. To continue the foregoing example, it is to be assumed that the access list of malwareOne.exe is retrieved and that once all files have been classified against predefined access policies, it is determined that six (6) of those files were found to be containing sensitive content.

If the files read by a suspect module or process, as identified through CAS 140, are found to contain sensitive information, as identified through DLPS 130, content-aware compromise assessment processor (CACAP) 150 can conclude that sensitive files were read by the suspicious module or process. The extent to which sensitive information was consumed by a suspect module or process can then be then be used to re-evaluate the suspicion score of the suspect process, of the infected machine and the overall security incident. For example, the suspicion score of malwareOne.exe mentioned above may be increased from 46 to, for example, 76. Using the aforementioned technique, a more accurate business-specific assessment of leaked data and loss due to a breach can be determined.

In certain embodiments, the forensics employed by a security analyst can include the use of a mechanism that actively filters file system operations and network operations and generates correlations between those files and network operations performed by various processes. These correlations can be used to build contextual information in the form of a PNF (Process Network Files) graph that can be leveraged by a security analyst. A security analyst can traverse the graph and look for suspicious activities. Data for PNF graphs may be derived from data output by various components of DLPS 130 and CAS 140 and, since these processes run on all endpoint terminals 120, monitoring and graph generation is done even when machines are off the corporate networks. The graphing process, representatively illustrated by PNF graphing processor 155, builds correlations between file operations (reads, writes) and network operations (send, receive). The security analyst can thus identify what files or data was involved in suspicious data transfers.

As used herein, a PNF graph is a complex data structure that contains details of files, network connections and processes and relations between them. Files, network connections and processes are treated as nodes in the graph. A security analyst can look for any node in the graph and can traverse the graph to look for suspicious activities. For example, a suspicious network connection in the graph may be located and the graph may be traversed from the node representing the suspicious connection to find which process initiated the connection and what files were read by the process. Traversing the graph further might reveal how the files that were read by the process are created.

Figure 2:
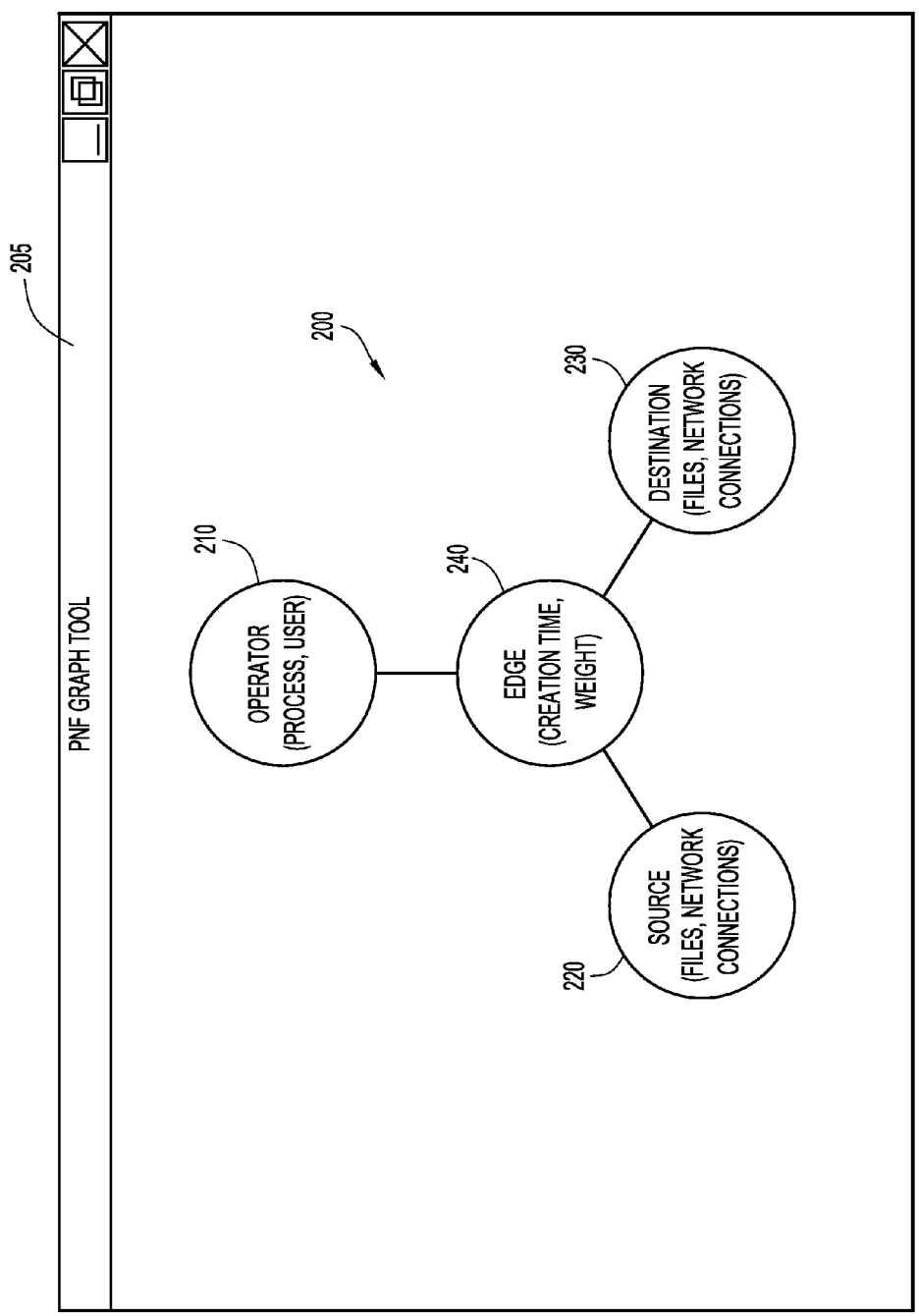
FIG. 2 is a diagram of a process-network-files (PNF) graph tool for analysis in embodiments of the present general inventive concept.

FIG. 2 is an illustration of a simple PNF graph 200 as would be presented to a user in an exemplary window 205 of a graphical user interface. As used herein, a file node in the graph represents a file in data storage infrastructure 110. This node may contain the file's path, modified time, size, and hash or checksum. Different versions of the file may be maintained in the graph 200 by recording the modified time, i.e., when an existing file on the disk is modified, and generating a new file node for the updated file with an updated modified time, size and checksum. A file node can be either a source node 220 or destination node 230. If a file node is a source node then it can be used to determine from where the data was copied or transformed. If a file node is a destination node then it can be used to determine how the file was created.

All the network connections are represented by a network node, which may contain a source IP address, destination IP address, port number, connection start time, connection end time, bytes of data uploaded, and bytes of data downloaded. Like a file node, a network connection node can be either a source node 220 or destination node 230. If a network connection is a source node 220, then it can be used to determine whether any malicious content is downloaded into the host endpoint terminal 120. If a network connection is a destination node 230, then it can be used to determine whether the process or user uploaded any sensitive content.

Operator nodes 210 represent the "who" node of the graph and may include process ID, process path, process start time, process end time, parent process ID, and/or user ID.

An edge 240 in a PNF graph 200 represents the relation between various nodes in the graph and may contain edge creation time and weight attributes. Each edge 240 in the graph 200 is connected to three nodes: a source node 220 (node responsible for source of data), a destination node 230 (node responsible for destination of data) and an operator node 210 (process that performed the action). At any given time, a process might be executing multiple file and/or network operations over multiple network connections. In some cases, a malicious/infected process may attempt to hide data exfiltration operations among operations that the process performs for legitimate purposes. For example, a process might read three files: a configuration file by which it varies its runtime behavior, a completely unrelated configuration file to determine how a user interface element is to be displayed and an important business document. The process may also establish three network connections, one to a printer server, one to a white-listed website and one to upload the business document to a malicious infiltrator's command and control system. In an embodiment of the present invention, all three of the read operations and all three of the network connections will be represented in PNF graph 200 with the process indicated in the operator node 210, each of the read files being indicated in separate source nodes 220, each of the network connections being indicated in separate destination nodes 230 and the relationships between process, files and network connections being indicated in respective edges 240. In order to assist a forensics technician in isolating data exfiltration from other operations, each edge 240 may be given a weight from, for example, 1 to 100 that indicates a level of suspicious behavior. The value of the weight may be calculated based on various operations and parameters associated with the process, thread id, time of operation, operation vs. access control policies, etc. In the foregoing example, a weight of 100 might be assigned to the edge 240 connecting operator node 210 indicating the executing process with the source node 220 indicating the sensitive business document and the destination node 230 indicating the network connection to the infiltrator's command and control center.

Through PNF graph 200, a security analyst will have high visibility into the activities, applications, and persons on their network. If a particular process is identified as malicious, the security analyst can traverse the graph to identify how the process executable file got copied into the particular machine. In that the DLP and CA agents 135 and 145, respectively run on the endpoint terminal 120 even the machine is disconnected from enterprise network 100, a security analyst will have visibility into data transfers which cannot be captured with traditional network based (packet capture) analytic techniques. If a well-known process performs unusual data transfers (e.g., WINDOWS NOTEPAD application uploading files to remote servers), such is indicated through the PNF graph 200 and the particular endpoint terminal 120 can be identified as being compromised. This cannot be captured with conventional network analytic tools as they do not capture information on individual processes executing on endpoint terminals 120. However, embodiments of the present invention can obtain such information by traversing PNF graph 200.

FIG. 3 is a flow diagram of a content-aware compromise assessment (CACA) process 300 by which the present invention can be embodied. In operation 305, DLP and CA agents are executed throughout enterprise network 100 to monitor file accesses by various processes also executing throughout enterprise network 100. In operation 310, a monitoring interval may begin over which items in various access lists are considered relevant. It is to be understood that while only a single monitoring interval is illustrated in FIG. 3, each access list may have separate, independently running monitoring intervals and the analysis of process 300 may be of data collected during the overlap of all running monitoring intervals.

In operation 315, it is determined whether a file has been accessed by a particular process executing on a processor of enterprise network 100. If so, process 300 transitions to operation 320 in which an identifier of the file, e.g., the local file system path, that was accessed is stored in the access list associated with the process that accessed that file. The access lists can be modified by both DLP and CA agents 135 and 145, respectively, with DLP agents 135 responsible for monitoring file accesses and CA agents 145 responsible for monitoring process execution. In operation 325, each process executing on processors of enterprise network 100 is assigned a suspicion score based on its in-memory behavior as determined by CAS 140. In operation 330, each suspicion score is evaluated against a suspiciousness threshold that is established to indicate which processes warrant additional security analysis. That is, any process that is determined by CAS 140 to be behaving normally or that is whitelisted, for example, would fall below the threshold and be considered "routine" or otherwise not of a suspicious nature, whereas those processes behaving abnormally would be over the threshold and warrant additional scrutiny. In accordance with the present invention, such additional scrutiny would indicate whether the abnormal behavior of a particular process is due to attempts at data exfiltration.

In operation 335, the processor on which the suspicious process is executing is determined. It is to be understood that the processor may be on an endpoint terminal or may be a processor on one of the servers of enterprise network 100. In operation 350, content-aware compromise assessment is performed on the suspicious process at the processor executing that process by analyzing the file access list 345 compiled for the suspicious process against the enterprise's access policies 340. In operation 355, the suspicion score for the suspicious process can be modified based on the content-aware compromise assessment of operation 350. If it is determined that the suspicious process is violating access policies, the suspicion score may be increased, and increased even more if it is determined that the files involved are of a highly sensitive nature. If, however, it is determined that the suspicious process is acting abnormally, but within authorized bounds, the suspicion score for that process can be reduced. Such assessment may involve eyes-on analysis by trained security technicians, which is determined in operation 370. If such additional analysis would be beneficial, the security analyst may launch the PNF graph tool in operation 375.

In operation 360, it is determined whether the monitoring interval begun in operation 310 has ended. If so, the access lists are purged of previously collected data outside of the monitoring window. In operation 380, context-aware compromise assessment process 300 is terminated if termination is desired. Otherwise, process 300 resumes, such as at operation 315.

Certain embodiments of the present general inventive concept provide for the functional components to be manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but are not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method for assessing compromises of data security, the method comprising:
   establishing access control policies for data files stored in storage devices across a communication network of an enterprise:
   monitoring processes executing on respective processors of the enterprise for file system operations performed thereby:
   assigning a suspicion score to each of the processes based on a degree to which in-memory behavior of the process deviates from previously established criteria;
   analyzing, in response to the suspicion score assigned to any of the processes meeting a suspicious process criterion, file system operations performed by the suspicious process against the access control policies;
   modifying the suspicion score based on a degree to which the file system operations performed by the suspicious process violate the access control policies;
   monitoring each process executing on each processor for data transport operations performed thereby in addition to the monitoring of the file system operations;
   storing attributes of each of the file system operations and each of the data transport operations in respective graph node data structures;
   identifying one or more correlations, each of the one or more correlations correlating one or more of the file system operations with one or more of the data transport operations for a given one of the processes;
   storing attributes of the one or more correlations in graph edge data structures;
   generating a process-network-file (PNF) graph data structure in which the graph node data structures representing the file system operations and the data transport operations are logically connected one to another through corresponding graph edge data structures representing the one or more correlations; and
   rendering a representation of the PNF graph data structure on a display such that graphical representations of the graph node data structures are graphically linked by graphical representations of the graph edge data structures;
   wherein the attributes of a given one of the one or more correlations stored in the graph edge data structures include a weight indicating the given correlation, and rendering the representation of the PNF graph data structure includes indicating the weight in the graphical representation of the graph edge data structures for the given correlation;
   wherein the PNF graph data structure comprises, for the given correlation:
      at least one source node corresponding to one or more of the graph node data structures, the source node representing at least one of a source file and a source network connection for the given process;
      at least one destination node corresponding to one or more of the graph node data structures, the destination node representing at least one of a destination file and a destination network connection for the given process;
      at least one operator node corresponding to one or more of the graph node data structures, the operator node representing at least one of the given process and a user associated with the given process; and
      at least one edge node corresponding to one or more of the graph edge data structures, the edge node representing relationships between the at least one source node, the at least one destination node and the at least one operator node; and
   wherein the at least one edge node depicts the weight, which is an indication of a level of suspicious behavior associated with at least one of one or more of the file system operations and one or more of the data transport operations represented by the source node, the destination node and the operator node.

2. The method of claim 1, wherein the access control policies include specifications of business-sensitive content contained in the data files, and analyzing the file system operations comprises analyzing the content of the data files accessed through the file system operations against the specifications of the business-sensitive content.

3. The method of claim 1, further comprising:
   storing identifiers of the data files in an access list for each of the processes executing on each of the processors: and
   purging the stored identifiers in accordance with a predetermined moving time window.

4. The method of claim 1, wherein at least one of the file system operations comprises at least one of a read and a write directed to one or more of the data files stored in one or more of the storage devices.

5. The method of claim 1, wherein at least one of the data transport operations comprises at least one of sending and receiving one or more of the data files over at least one network.

6. The method of claim 1, wherein the at least one source node comprises a file node representing the source file, and wherein the representation of the PNF graph data structure is configured to be traversed to utilize the file node to determine from where the source file was copied or transformed by the given process.

7. The method of claim 1, wherein the at least one destination node comprises a file node representing the destination file, and wherein the representation of the PNF graph data structure is configured to be traversed to utilize the file node to determine how the destination file was created.

8. The method of claim 1, wherein the at least one source node comprises a network node representing the source network connection, and wherein the representation of the PNF graph data structure is configured to be traversed to utilize the network node to determine whether malicious content was downloaded to a destination address identified in the source node.

9. The method of claim 1, wherein the at least one destination node comprises a network node representing the destination network connection, and wherein the representation of the PNF graph data structure is configured to be traversed to utilize the network node to determine whether the given process uploaded sensitive content.

10. The method of claim 1, wherein a given one of the access control policies comprises one or more regular expressions identifying at least one of one or more categories of data and one or more terms that correspond to business-sensitive content in the data files.

11. The method of claim 1, wherein a given one of the access control policies comprises one or more identities of designated portions of a file hierarchy, one or more user permissions and descriptive data of what is considered business-sensitive content in the data files.

12. An apparatus for assessing compromises of data security, the method apparatus comprising:
   a data security system configured to:
      establish access control policies for data files stored in storage devices across a communication network of an enterprise;
      compile a list of the data files accessed by processes executing on processors of the enterprise; and
      assign a suspicion score to each of the processes based on a degree to which in-memory behaviors of the respective processes deviate from previously established criteria; and a context-aware compromise assessment processor (CACAP) configured to:
      analyze, in response to the suspicion score assigned to any of the processes meeting a suspicious process criterion, file system operations performed by the suspicious process against the access control policies; and
      modify the suspicion score based on a degree to which the file system operations performed by the suspicious process violate the access control policies;
   wherein the data security system monitors each of the processes executing on the processors for data transport operations performed thereby in addition to the monitoring of the file system operations, and the CACAP is further configured to:
      store attributes of each of the file system operations and each of the data transport operations in respective graph node data structures;
      identify one or more correlations, each of the one or more correlations correlating one or more of the file system operations with one or more of the data transport operations for a given one of the processes;
      store attributes of the one or more correlations in graph edge data structures;
      generate a process-network-file (PNF) graph data structure in which the graph node data structures representing the file system operations and the data transport operations are logically connected one to another through corresponding graph edge data structures representing the one or more correlations; and
   further comprising a display on which to render a representation of the PNF graph data structure such that graphical representations of the graph node data structures are graphically linked by graphical representations of the graph edge data structures;
   wherein the CACAP is further configured to:
      store attributes of a given one of the one or more correlations in the graph edge data structures to include a weight indicating the given correlation; and
      render the representation of the PNF graph data structure to indicate the weight in the graphical representation of the graph edge data structure for the given correlation;
   wherein the PNF graph data structure comprises, for the given correlation:
      at least one source node corresponding to one or more of the graph node data structures, the source node representing at least one of a source file and a source network connection for the given process;
      at least one destination node corresponding to one or more of the graph node data structures, the destination node representing at least one of a destination file and a destination network connection for the given process;
      at least one operator node corresponding to one or more of the graph node data structures, the operator node representing at least one of the given process and a user associated with the given process; and
      at least one edge node corresponding to one or more of the graph edge data structures, the edge node representing relationships between the at least one source node, the at least one destination node and the at least one operator node; and
   wherein the at least one edge node depicts the weight, which is an indication of a level of suspicious behavior associated with at least one of one or more of the file system operations and one or more of the data transport operations represented by the source node, the destination node and the operator node.

13. The apparatus of claim 12, wherein the access control policies include specifications of business-sensitive content contained in the data files, and the CACAP analyzes the content of the data files accessed through the file system operations against the specifications of the business-sensitive content.

14. The apparatus of claim 12, wherein the data security system purges the list in accordance with a predetermined moving time window.

15. The apparatus of claim 12, wherein the data security system comprises a compromise assessment system and a data leakage prevention system.

16. The apparatus of claim 12, wherein:
   at least one of the file system operations comprises at least one of a read and a write directed to one or more of the data files stored in one or more of the storage devices; and
   at least one of the data transport operations comprises at least one of sending and receiving one or more of the data files over at least one network.

17. A tangible, non-transient computer-readable medium having processor instructions encoded thereon that, when executed by one or more processors, configure the one or more processors to:
   enforce access control policies for data files stored on storage devices across a communication network of an enterprise;
   compile a list of the data files accessed by processes executing on processors of the enterprise;
   assign a suspicion score to each of the processes based on a degree to which in-memory behavior of the process deviates from previously established criteria;
   analyze, in response to the suspicion score assigned to any of the processes meeting a suspicious process criterion, file system operations performed by the suspicious process against the access control policies;
   modify the suspicion score based on a degree to which the file system operations performed by the suspicious process violate the access control policies;
   monitor each process executing on each processor for data transport operations performed thereby in addition to the monitoring of the file system operations;
   store attributes of each of the file system operations and each of the data transport operations in respective graph node data structures;

identify one or more correlations, each of the one or more correlations correlating one or more of the file system operations with one or more of the data transport operations for a given one of the processes;

store attributes of the one or more correlations in graph edge data structures;

generate a process-network-file (PNF) graph data structure in which the graph node data structures representing the file system operations and the data transport operations are logically connected one to another through corresponding graph edge data structures representing the one or more correlations; and render a representation of the PNF graph data structure on a display such that graphical representations of the graph node data structures are graphically linked by graphical representations of the graph edge data structures;

wherein the attributes of a given one of the one or more correlations stored in the graph edge data structures include a weight indicating the given correlation, and the processor instructions include those that configure the one or more processors to render the representation of the PNF graph data structure to include an indication of the weight in the graphical representation of the graph edge data structure for the given correlation;

wherein the PNF graph data structure comprises, for the given correlation:

at least one source node corresponding to one or more of the graph node data structures, the source node representing at least one of a source file and a source network connection for the given process;

at least one destination node corresponding to one or more of the graph node data structures, the destination node representing at least one of a destination file and a destination network connection for the given process;

at least one operator node corresponding to one or more of the graph node data structures, the operator node representing at least one of the given process and a user associated with the given process; and at least one edge node corresponding to one or more of the graph edge data structures, the edge node representing relationships between the at least one source node, the at least one destination node and the at least one operator node; and wherein the at least one edge node depicts the weight, which is an indication of a level of suspicious behavior associated with at least one of one or more file system operations and one or more data transport operations represented by the source node, the destination node and the operator node.

18. The computer-readable medium of claim 17, wherein the access control policies include specifications of business-sensitive content contained in the data files, and the processor instructions include those that configure the one or more processors to:

analyze the file system operations comprises analyzing the content of the data files accessed through the file system operations against the specifications of the business sensitive content.

19. The computer-readable medium of claim 17, wherein the processor instructions include those that configure the one or more processors to:

store identifiers of the data files in an access list for each of the processes executing on each of the processors; and purge the stored identifiers in accordance with a predetermined moving time window.

20. The computer-readable medium of claim 17, wherein:

at least one of the file system operations comprises at least one of a read and a write directed to one or more of the data files stored in one or more of the storage devices; and at least one of the data transport operations comprises at least one of sending and receiving one or more of the data files over at least one network.

* * * * *